United States Patent [19]

Matsuzaki

[11] Patent Number: 4,998,248
[45] Date of Patent: Mar. 5, 1991

[54] INTEGRATED SERVICES DIGITAL NETWORK (ISDN) SYSTEM AND MULTIMEDIA DATA CONNECTION METHOD IN SAME SYSTEM

[75] Inventor: Takanori Matsuzaki, Yokohama, Japan

[73] Assignee: Hitachi, Ltd., Tokyo, Japan

[21] Appl. No.: 357,347

[22] Filed: May 25, 1989

[30] Foreign Application Priority Data

May 27, 1988 [JP] Japan ................... 63-128380

[51] Int. Cl.⁵ ............................ H04J 3/12; H04J 3/24
[52] U.S. Cl. .................................. 370/110.1; 370/94.1
[58] Field of Search ..................... 370/110.1, 60, 60.1, 370/58.1, 58.2, 58.3, 94.1, 94.2, 94.3; 358/442, 425

[56] References Cited

U.S. PATENT DOCUMENTS 4,888,766 12/1989 Ogasawara ...................... 370/110.1
4,903,261 2/1990 Baran et al. ..................... 370/110.1

FOREIGN PATENT DOCUMENTS 61-214837 9/1986 Japan .

Primary Examiner—Douglas W. Olms
Assistant Examiner—Wellington Chin
Attorney, Agent, or Firm—Fay, Sharpe, Beall, Fagan, Minnich & McKee

[57] ABSTRACT

An integrated services digital network (ISDN) system has an ISDN; and a plurality of media equipments, including at least one media device, connected with the ISDN through subscriptor lines, at least one of the media equipments including a plurality of media devices. Each of the media equipments comprises: communication control device connected with corresponding one of the subscriptor lines, for controlling the connection of the media devices within the relevant media equipment with the subscriptor line and at the same time transmitting and receiving data on the subscriptor line; and a data file storing a first identification mark for identifying the relevant media equipment and second identification marks for identifying the media devices within the relevant media equipment and also storing a first identification mark for identifying at least another media equipment and second identification marks for identifying media devices within said another media equipment.

9 Claims, 6 Drawing Sheets

FIG. 7

| TERMINAL NAME | ADDRESS |
|---|---|
| 2A1 | a, Y |
| KIND ADDRESS | KIND OF MEDIA EQUIPMENT |
| Ⓐ | DISPLAY |
| Ⓑ | TELEPHONE |
| Ⓒ | FACSIMILE |

FIG. 8

| TERMINAL NAME | ADDRESS |
|---|---|
| 2A1 | a, Y |
| ADDRESS | KIND OF MEDIA |
| Ⓐ | IMAGE DATA |
| Ⓑ | SOUND DATA |
| Ⓒ | FACSIMILE DATA |

INTEGRATED SERVICES DIGITAL NETWORK (ISDN) SYSTEM AND MULTIMEDIA DATA CONNECTION METHOD IN SAME SYSTEM

BACKGROUND OF THE INVENTION

This invention relates to an integrated services digital network (hereinbelow called simply ISDN) system, in which data communication is effected among media equipments through an ISDN, and in particular to multimedia equipments and a method for connecting the multimedia equipments, by which in each of the multimedia equipments connected to the ISDN, among media devices (input/output devices) within the relevant multimedia equipment or kinds of the media devices (or kinds of media) one, for which connection is demanded, is identified and connected to the ISDN.

In a system, in which a plurality of media equipments (media terminals and a host computer) are connected with an ISDN through subscriptor lines and data communication is effected among media terminals through the ISDN, it is possible to transmit data by using 2 to 24 lines of B channel by means of one subscriptor line. Consequently, since it is possible to transmit multimedia data, i.e. image data for facsimile, sound data, and other ordinary data, through one subscriptor line, in the case where a plurality of media terminals are connected with the relevant subscriptor line, it is necessary for each of the media terminals to receive data, while judging whether the data on the subscriptor line are for the own media terminal or not.

As a method for identifying the media terminals, for which connection is demanded, among a plurality of media terminals connected with the relevant subscriptor line, there is known a method, by which a sub-address in an ISDN number is used, as indicated e.g. in JP-A-No. 61-214837 and Recommendation of CCITT, E. 164.

However, according to the techniques stated above, although it was possible to identify the media terminals connected with the same subscriptor line, it was not possible to identify one, for which connection is demanded, among a plurality of media devices, or the kind of the media devices (or the kind of media such as image, sound, graphic, etc.), for which connection is demanded, in the case where the relevant terminal is a multimedia terminal having a plurality of media devices (e.g. facsimile device, telephone, etc).

SUMMARY OF THE INVENTION

An object of this invention is to provide as ISDN system and a method for connecting multimedia equipments, by which, in the ISDN system, in the case where media equipments connected with the ISDN are multimedia equipments each having a plurality of media devices, the media device or the kind of media devices (or kind of media), for which connection is demanded, in a multimedia equipment stated above is identified and connected with the ISDN.

In order to achieve this object, according to this invention, when data communication is effected between multimedia equipments (terminal having a plurality of media devices or a host computer having plural media devices) through the ISDN, the equipments are connected with each other by a procedure according to the protocol of the ISDN and in this case an ISDN number is transmitted and received between the relevant equipments, whereby a sub-address (address which an user of the ISDN can utilize freely) in it includes an identification mark indicating the media device or the kind of media devices (or kind of media) in addition to the mark identifying the terminal of the destination of the communication, which has been utilized heretofore. By transmitting these marks from one multimedia equipment to the other multimedia equipment, in the other equipment a media device corresponding to the media device or the media indicated by the identification mark is connected with the ISDN.

According to this invention, in each of the multimedia equipments there are set a first identification indicating the own multimedia equipment and second identification marks indicating media devices or kinds of media devices (or kinds of media) in the relevant equipment. At the same time, together with the first identification mark indicating the other multimedia equipment, with which the data communication is to be effected, the second identification marks indicating media devices in this equipment or kinds of media devices (or kinds of media) are previously set and stored as a data base. In this state, in the case where from one multimedia equipment to a media device, e.g. a facsimile device in another multimedia equipment, facsimile data are transmitted, the one multimedia equipment searches the second identification mark of the facsimile device together with the first identification mark of the other multimedia equipment from the data base and inputs them in the sub-address of the ISDN number. Then they are transmitted to the subscriptor line according to the protocol of the ISDN. At this time the other multimedia equipment judges whether it is a connection demand to the other multimedia equipment by using the first identification mark in the subaddress transmitted from the one multimedia equipment, and when it judges that it is a connection demand, it is possible to identify the media device, i.e. the facsimile device, for which connection is demanded, by using the second identification mark. Consequently it is possible to begin the data communication by connecting the facsimile device stated above with the ISDN through the multimedia equipment.

In addition, in the case where the second identification mark indicates a kind of media devices (or a kind of media), for example in the case where there are a plurality of facsimile devices, when the second identification mark indicates simply to be a facsimile device or facsimile data, the other multimedia equipment selects automatically or manually one facsimile device among the facsimile devices and executes a connection process to the ISDN.

In this way, according to this invention, since it is possible to identify the media device or the kind thereof, for which connection is demanded, at the establishment of the connection of the media device with the ISDN by using the sub-address in the ISDN number, the access process in the system, where multimedia equipments are connected with the ISDN, can be effected with efficiency.

BRIEF DESCRIPTION OF THE DRAWINGS

FIGS. 7 and 8 show examples of the address table in the data file in modified examples of this invention.

DESCRIPTION OF THE PREFERRED EMBODIMENTS

Hereinbelow typical embodiments of this invention will be explained.

Figure 1:
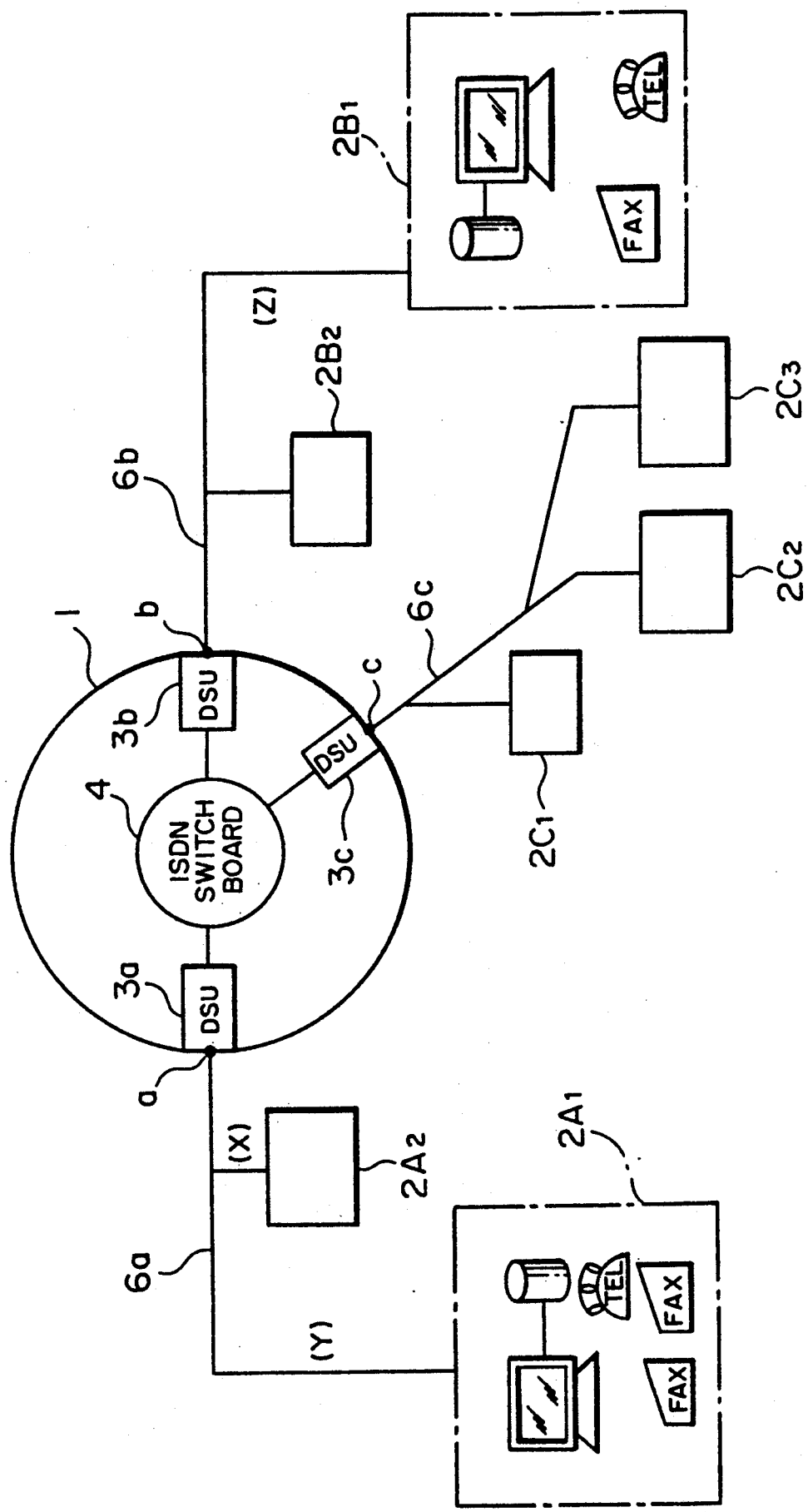
FIG. 1 is a block diagram illustrating the outline of the construction of the ISDN system, to which this invention is applied.

FIG. 1 is a scheme illustrating the whole construction of the ISDN system, to which this invention is applied. In the figure, reference numeral 1 represents an ISDN, in which a plurality of (here e.g. 3) digital service units (hereinbelow called simply DSU) $3a$, $3b$, $3c$, . . . are connected with each other through an ISDN switch board 4. Terminals and multimedia terminals are connected with each of the DSUs $3a$, $3b$, $3c$ through a subscriptor lines $6a$, $6b$, $6c$. Here it is supposed, for example, that a terminal $2A_2$ and a multimedia terminal $2A_1$ are connected with a line $6a$; a terminal $2B_2$ and a multimedia terminal $2B_1$ are connected with a line $6b$; terminals $2C_2$, $2C_3$ and a multimedia terminal $2C_1$ are connected with a line $6c$. As indicated in the figure, each of the multimedia terminals is provided with e.g. usual data terminals (e.g. a display device having an input key board), sound data terminals (e.g. a telephone device), facsimile devices, which are facsimile data terminals, etc.

Further, in order to identify the plurality of terminals connected with a subscriptor line, the addresses of the terminals $2A_1$ and $2A_2$ on the subscriptor line $6a$ are defined e.g. as X and Y, respectively. Furthermore the address of the terminal $2B_1$ on the line $6b$ is defined e.g. as Z. a, b and c are addresses of the data terminal equipments (DTE) for identifying unambiguously the lines $6a$, $6b$, $6c$ to be connected in the ISDN system.

Figure 2:
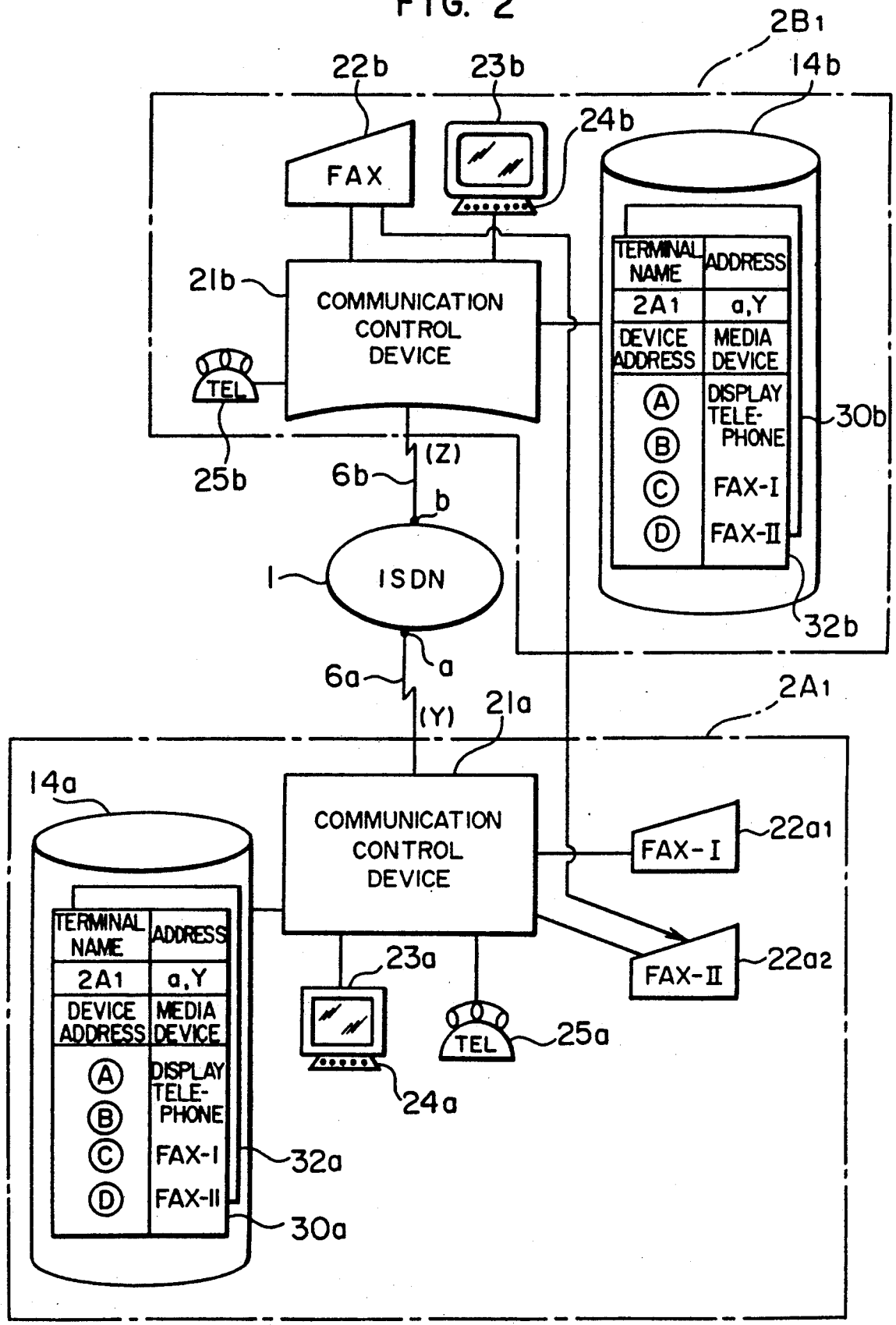
FIG. 2 is a scheme showing the construction of the principal part of a typical embodiment of the ISDN according to this invention.

FIG. 2 is a scheme illustrating the construction of the principal part of an embodiment of the ISDN system according to this invention. Here this invention will be explained, taking a case where data communication is executed between the multimedia terminals $2A_1$ and $2B_1$ as an example. Therefore the terminals other than the terminals $2A_1$ and $2B_1$ are omitted in the figure.

The terminal $2A_1$ is provided e.g. with a display device $23a$ having an input device (e.g. an input key board) $24a$, a telephone device $25a$, two facsimile devices (FAX-I) $22a_1$ and (FAX-II) $22a_2$, a data file $14a$ and a communication control device $21a$. Similarly the terminal $2B_1$ is provided e.g. with a data file $14b$ and a communication control device $21b$ in addition to a display device $23b$ having an input device $24b$ and a facsimile device $22b$ as an input/output device (media device). Each of the data files $14a$ and $14b$ includes a table $30a$, $30b$ storing the address of the own terminal and the addresses of the media devices within the own terminal and at the same time holds an address table $32a$, $32b$ storing the address of the terminal, with which communication is to be executed, and the addresses of the media devices within the relevant terminal to be communicated as a data base. That is, a data base $14b$ includes a table $30b$ storing the address Z of the terminal name $2B_1$ of the own terminal, the address b of the corresponding DTE and the addresses (omitted) of the media devices within the own terminal and a table $32b$ holding the address Y of the terminal name $2A_1$ of the terminal $2A_1$, with which communication is to be executed, the address a of the corresponding DTE and the names as well as the addresses A , B , C and D of the media devices within the terminal $2A_1$.

On the other hand the data base $14a$ of the terminal $2A_1$ is provided also with a table $30a$ storing the address of the own terminal, etc. and a table $32a$ storing the address of the terminal $2B_1$, with which communication is to be executed, etc.

Consequently each data base has the number of tables, which is equal to the number of communication destinations.

Each of the communication control devices $21a$, $21b$ reads out the address of a terminal with which communication is to be executed and the address of a media device of the communication destination thereof from the data base in the own terminal; puts them in the connection demanding signal; and sends them to the ISDN according to the procedure of the ISDN protocol, or judges whether the terminal, which is to be connected, is the own terminal or not on the basis of the ISDN number in the connection demanding signal received from the ISDN; searches the media device, which is to be connected, from the data file, in the case where the signal is for the own terminal; and executes the connection process for the media device, which has been searched according to the procedure of the ISDN protocol.

The data in each of the data file can be set arbitrarily by a user of the ISDN system. For example it is possible to set it so that the name of the media device represented by A , which is a device of the terminal $2A_1$, is a display; the address B is a telephone; the address C is FAX-I; and the address D is FAX-II.

Such a data setting may be effected through the input devices $24a$, $24b$ in each of the terminals before the beginning of the data communication or by setting data of the own terminal and the destination terminals all together at a terminal and sending necessary data to the destination terminals to store them.

Figure 3:
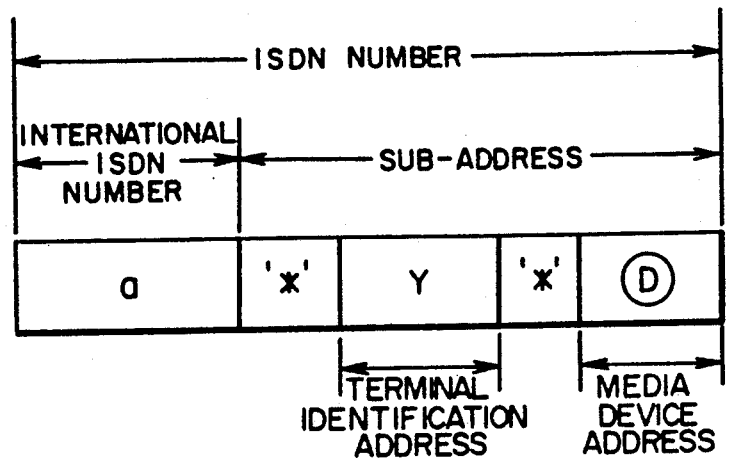
FIG. 3 indicates an example of the ISDN number transmitted and received between multimedia terminals in the embodiment indicated in FIG. 2.

FIG. 3 is a scheme illustrating the structure of an ISDN number in the connection demanding signal transmitted and received between terminals, when the terminals are connected through the ISDN. The example indicated in FIG. 3 shows an ISDN number, in the case where connection is made from the terminal $2B_1$ to the device FAX-II in the terminal $2A_1$. As it can be seen from the figure, the ISDN number consists of an international ISDN number and a sub-address. The international ISDN number includes the DTE address (here a) of the terminal of the destination, which is to be connected and the sub-address includes an terminal identification address, i.e. the address Y of the terminal $2A_1$ of the destination, and a media device address; i.e. the address D of the media device, which is the object to be connected, in the terminal $2A_1$ of the destination. In the figure, a mark * is a delimitter indicating a pause between addresses, etc.

Further a user can set freely the structure of the sub-address in the ISDN address. The pause between the sub-address and the international ISDN address is indicated by "*" and the data succeeding the first * may be data for identifying the name of the media device and the data succeeding the second * may be data for identifying the terminal on the relevant subscriptor line.

Next the connection procedure will be explained, referring to FIGS. 4 to 6 for the case where data are transmitted from a media device in one multimedia terminal to a media device in another multimedia terminal, e.g. from the facsimile device 22b in the multimedia terminal 2B₁ to the facsimile device (FAX-II) 22a₁ in the multimedia terminal 2A₁.

Figure 4:
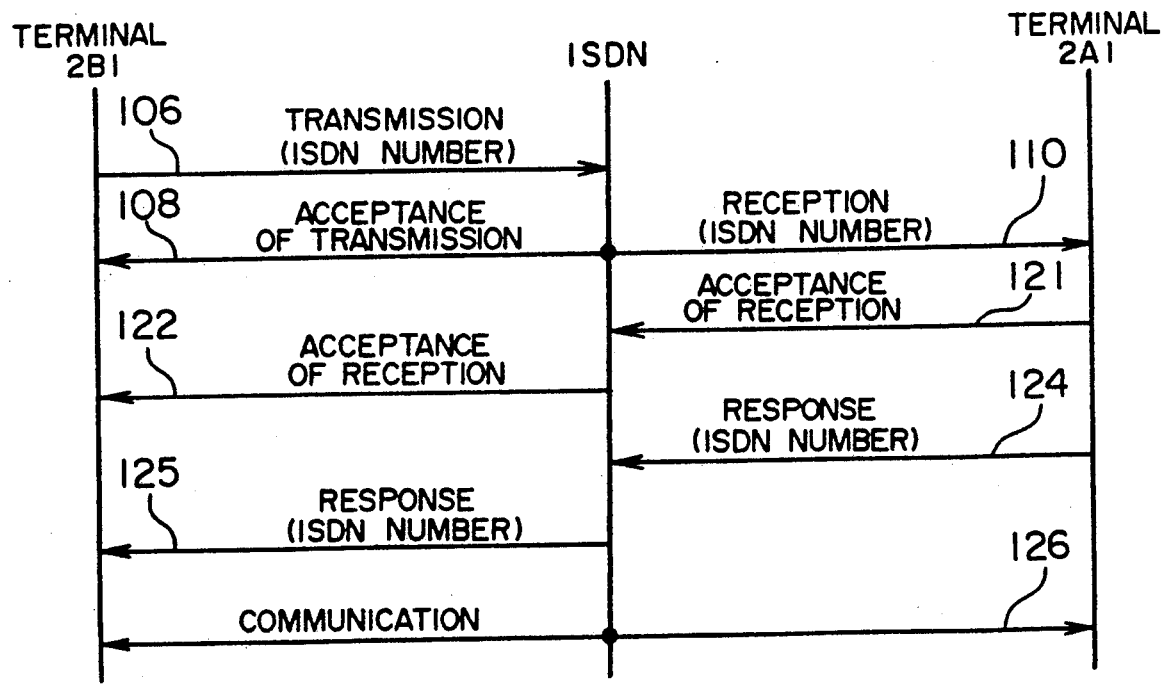
FIG. 4 indicates the process of the connection between multimedia terminals according to this invention.

FIG. 4 is a scheme illustrating the connection procedure between multimedia terminals according to this invention, which is a control sequence indicating the communication procedure among a terminal—an ISDN—a terminal. FIGS. 5 and 6 are flow charts indicating the connection processes by the communication control device in the terminal on the transmitter side and the terminal on the receiver side, respectively.

At first the user operates the input device 24b to input information to be transmitted, which is formed by means of the facsimile device 22b in the multimedia terminal 2B₂, in the communication control device 21b. At the same time he makes the display device 23b display data in the data file 14b, among which data he inputs the terminal name 2A₁ of the destination (FIG. 5, Step 100). He makes the display device display the kinds of the media device related to the terminal name 2A₁, among which he selects a media device of the destination (in this case the device FAX-II 22a₂) (Step 102).

Then the addresses of the inputted terminal name 2A₁ and the selected media device FAX-II are read out from the Table 32B in the data file 14b. That is, the address a of the DTE and the address Y of the terminal 2A₁ are read out from the address table of the terminal name 2A₁ and at the same time the address D of the facsimile device FAX-II in the terminal 2A₁ is read out (Step 104).

Figure 5:
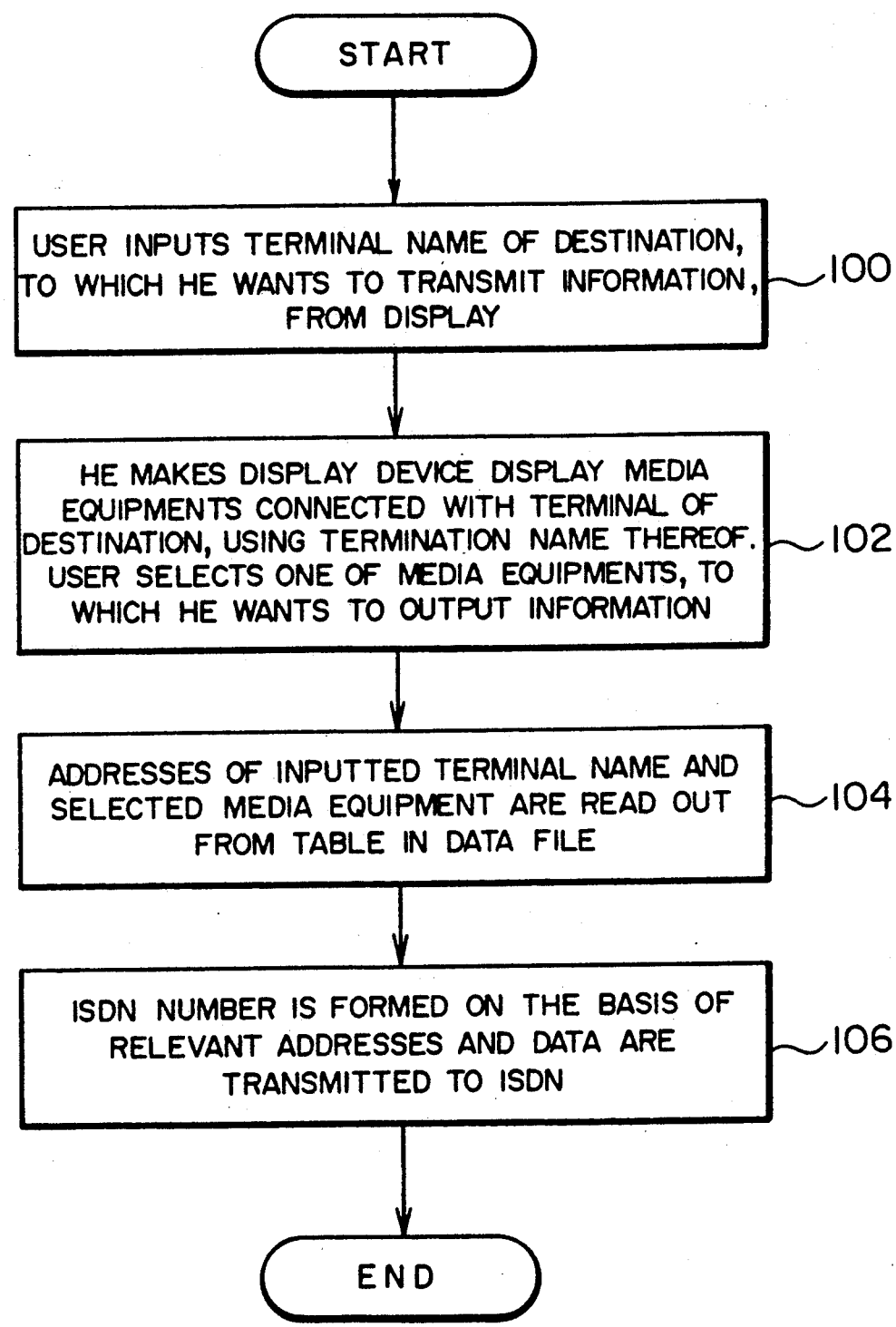
FIG. 5 is a flow chart showing the process of the connection in the communication control device on the transmitter side.
Figure 6:
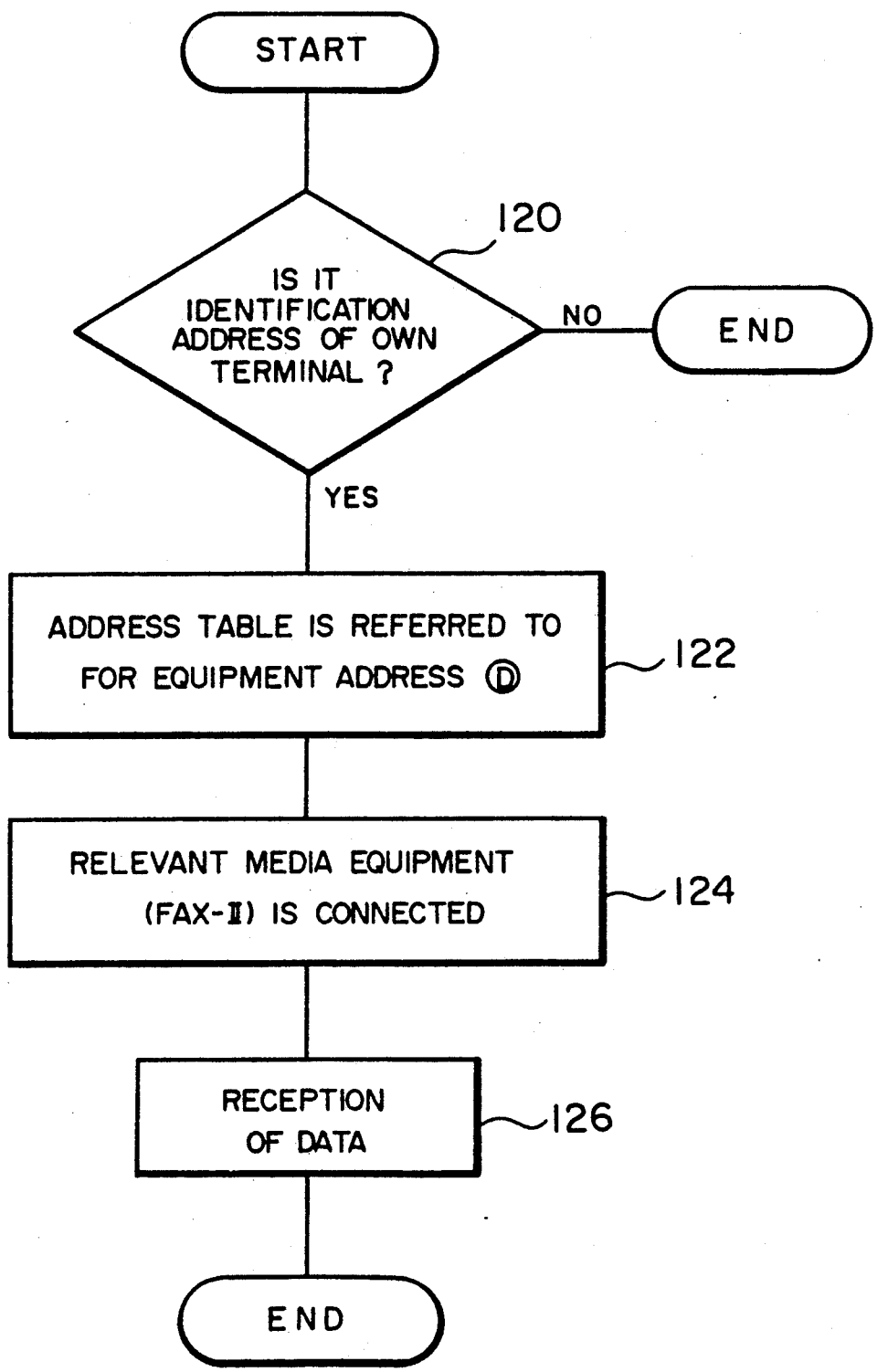
FIG. 6 is a flow chart showing the process of the connection in the communication control device on the receiver side.

In this way, as indicated in FIG. 3, the structure of the ISDN number is so formed that international ISDN number=a, terminal identification address on the subscriptor line 6a=Y, and address of the media device= D , and a connection request signal is transmitted by the terminal 2B₁ to the ISDN 1 (Step 106 in FIG. 5, Process 106 in FIG. 4).

When the ISDN receives the connection demanding signal, it returns an acceptance of transmission to the terminal 2B₁ (Process 108 in FIG. 4) and at the same time identifies the subscriptor line 6a, which is to be connected, from the international ISDN number and sends a reception signal to the line 6a (Process 110). This reception signal includes the ISDN number.

The communication control device 21a of the terminal 2A₁ receives the reception signal and reads out the terminal identification address Y in the sub-address. Then it judges whether the address is the identification address of the own terminal or not, referring to the table 32a (Step 120 in FIG. 6). In this case, since it is the identification address of the own terminal, the connection procedure is continued. In the case where it is not the identification address of the own address, the connection procedure is terminated.

Next, the communication control device 21a of the terminal 2A₁ stores the sub-address in the reception signal and at the same time returns an acceptance of reception to the ISDN (Process 121). The acceptance of the reception is sent to the terminal 2B₁ through the ISDN (Process 122). Further the communication control device of the terminal 2A₁ refers to the table 32b for the media device address D in the sub-address and identifies that the media device, which is to be connected, is FAX-II (Step 122).

Consequently the facsimile device FAX-II 22a₂ is connected with the line 6a through the communication control device 21a (Step 124).

Subsequently the communication control device 21a reads out the own sub-address from the table 30a, which is added to the response signal and sent to the ISDN 1 (Process 124). The response signal arrives at the terminal 2B₁ through the ISDN.

In this way the facsimile devices 22b and 22a₂ are connected with each other through the ISDN and facsimile data are transmitted and received therebetween (Process 126, Step 126).

Further the connection of the facsimile device with the line 6b may be effected also in the processing flow (Steps 100 to 106) indicated in FIG. 5 and still further the acceptance of reception (Process 122) indicated in FIG. 4 may be effected also by responding to the response signal (Process 125).

Although, in the above embodiment, the connection procedure has been explained between multimedia terminals, one of them may be a media terminal having only one media device, while the other is a multimedia terminal.

Although, in the above embodiment, the connection procedure has been executed by specifying the media device, which is to be connected with the ISDN, it may be executed by specifying the kind of media devices or the kind of media.

In the case where the kind of media devices is specified, e.g. display, telephone, facsimile device, etc. may be enumerated as the kind of media devices. In this case each of the tables indicated in FIG. 2 may be constructed as indicated in FIG. 7.

Consequently, in the case where it is required to connect the terminal 2B₁ with eather one of the facsimile devices FAX-I and FAX-II in the terminal 2A₁, the terminal 2B₁ adopts a media device kind address for the media device address in the ISDN number indicated in FIG. 3, sets C for the relevant address and sends it to the ISDN. In the terminal 2A₁ it can be known from the media device kind address C in the ISDN number that the connection object is the facsimile device, and thus it is sufficient to connect one of FAX-I and FAX-II, which is not busy or arbitrary one, in the case where none of them is busy, with the ISDN.

On the other hand, in the case where the kind of media is specified, e.g. facsimile data (corresponding to a facsimile device), sound data (corresponding to a telephone device), image data, character data, graphic data, etc. may be enumerated as the kind of media. In this case each of the tables 30a and 32b indicated in FIG. 2 is constructed as indicated in FIG. 8.

In this case also, similarly to that described above, the terminal 2B₁ adopts a media kind address for the media device address in the sub-address and sets C for the relevant address. In the terminal 2A₁ the connection procedure is executed by connecting selectively one of the two facsimile devices, responding to the address C .

Further, although, in the above embodiment, explanation has been made for the case where the multimedia equipment connected with the ISDN is a multimedia terminal, this invention can be applied also to a host computer having a plurality of media devices.

Still further, although in the above addresses consisting of alphabetical letters have been used as identification marks in the sub-address, any mark such as numerals, etc. may be used, if it can be identified.

According to this invention, since it is possible to identify the media device, which is to be connected, at establishing the connection in each of the multimedia equipment by using the ISDN number in the received data, an effect can be obtained that the communication processing efficiency is increased in a structure, where a plurality of multimedia equipments are connected with an ISDN.

We claim:

1. An integrated services digital network (ISDN) system having:

an ISDN; and a plurality of media equipments, including at least one media device, connected with said ISDN through subscriptor lines, at least one of said media equipments including a plurality of media devices;

in which each of said media equipments comprises:

communication control means connected with corresponding one of the subscriptor lines, for controlling the connection of the media devices within the relevant media equipment with the subscriptor line and at the same time transmitting and receiving data on the subscriptor line; and a data file storing a first identification mark for identifying said relevant media equipment and second identification marks for identifying the media devices within said relevant media equipment and also storing a first identification mark for identifying at least another media equipment and second identification marks for identifying media devices within said another media equipment;

wherein, in the case where communication is to be effected between said one media equipment and one media device in said another media equipment, said communication control means searches said first identification mark for said another media equipment and said second identification mark for the one media device in said another equipment by means of the data file within said one media equipment and executes a connection processing with a subscriptor line according to the ISDN protocol by sending the searched first and second identification marks to the line as a sub-address in an ISDN number; and wherein, in the case where communication is to be effected between said another media equipment and one media device in said one media equipment, the media device indicated by the second identification mark is connected with the subscriptor line, when it is judged that said first identification mark in the sub-address transmitted by said another media equipment through said ISDN represents an access demand to said one media equipment, by referring to the data file within said one media equipment.

2. An ISDN system according to claim 1, wherein said second identification mark is a mark indicating the kind of media device and in the case where there are a plurality of media devices indicated by said second identification mark in the received sub-address within said media equipment, said communication control means selects one of them to connect it with the subscriptor line.

3. An ISDN system according to claim 1, wherein said second identification mark is a mark indicating the kind of media and in the case where there are a plurality of media devices indicated by said second identification mark in the received sub-address within said media equipment, said communication control means selects one of them to connect it with the subscriptor line.

4. An ISDN system according to claim 1, wherein at least one of said media equipments is an equipment including a host computer as said communication control means.

5. A multimedia device connection method in an integrated services digital network (ISDN) system having an ISDN and a plurality of media equipments each having at least one media device, connected with said ISDN through subscriptor lines, at least one of said media equipments including a plurality of media devices, comprising:

a first step of storing, in each of said media equipments, a first identification mark for identifying said relevant media equipment and second identification marks for identifying said media devices within said relevant media equipment and also storing a first identification mark for identifying at least another media equipment and second identification marks for identifying media devices within said another media equipment as a data base;

a second step of reading out the first identification mark of said another media equipment and the second identification mark of one media device of said relevant media equipment by searching the data base of said first media equipment, when communication is to be effected between said relevant media equipment and said one media device of said another media equipment;

a third step of connecting the first and second identification marks as a sub-address of an ISDN number to the subscriptor line according to an ISDN protocol;

a fourth step of judging whether the first identification mark in the sub-address in the ISDN received in said another media equipment through the ISDN is an access demand to said another media equipment or not, by referring to the data base of said another media equipment;

a fifth step of searching the media device corresponding to said second identification mark in the sub-address by referring to the data base of said another media equipment, in the case where it is judged at the fourth step that it is an access demand to said another media equipment; and a sixth step of connecting the media device searched at the fifth step with the subscriptor line.

6. A multimedia device connection method in an ISDN system according to claim 5, wherein said second identification mark is a mark indicating the kind of media device and in the case where there are a plurality of media devices indicated by said second identification mark in the received sub-address within said media equipment, said fifth step selects one of them to thereby connect it with the subscriptor line at the sixth step.

7. A multimedia device connection method in an ISDN system according to claim 5, wherein said second identification mark is a mark indicating the kind of media and in the case where there are a plurality of media devices indicated by said second indentification mark in the received sub-address within said media equipment, said fifth step selects one of them to thereby connect it with the subscriptor line at the sixth step.

8. A multimedia device connection method in an ISDN system according to claim 5, wherein at least one of said media equipments is an equipment including a host computer as said communication control means.

9. A media equipment in an integrated services digital network (ISDN) system having an ISDN and a plurality of media equipments which each includes at least one media device and are connected with said ISDN through subscriptor lines, at least one of said media equipments including a plurality of media devices;

in which each of said media equipments comprises:
  communication control means connected with corresponding one of the subscriptor lines, for controlling the connection of the media devices within the relevant media equipment with the subscriptor line and at the same time transmitting and receiving data on the subscriptor line; and
  a data file storing a first identification mark for identifying said relevant media equipment and second identification marks for identifying the media devices within said relevant media equipment and also storing a first identification mark for identifying at least another media equipment and second identification marks for identifying media devices within said another media equipment;

wherein, in the case where communication is to be effected between said one media equipment and one media device in said another media equipment, said communication control means searches said first identification mark for said another media equipment and said second identification mark for the one media device in said equipment by means of the data file within said one media equipment executes a connection processing with a subscriptor line according to the ISDN protocol by sending the searched first and second identification marks to the line as a sub-address in an ISDN number; and wherein, in the case where communication is to be effected between said another media equipment and one media device in said one media equipment, the media device indicated by the second identification mark is connected with the subscriptor line, when it is judged that said first identification mark in the sub-address transmitted by said another media equipment through said ISDN represents an access demand to said one media equipment, by referring to the data file within said one media equipment.

* * * * *